US011981880B2

(12) United States Patent
Hirano et al.

(10) Patent No.: US 11,981,880 B2

(45) Date of Patent: May 14, 2024

(54) CLEANING COMPOSITION AND CLEANING METHOD FOR COMPONENT OF SEMICONDUCTOR MANUFACTURING PROCESS CHAMBER

(71) Applicant: TOKYO OHKA KOGYO CO., LTD., Kanagawa (JP)

(72) Inventors: Isao Hirano, Kawasaki (JP); Yasuo Suzuki, Kawasaki (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 44 days.

(21) Appl. No.: 17/512,097

(22) Filed: Oct. 27, 2021

(65) Prior Publication Data

US 2022/0135916 A1 May 5, 2022

(30) Foreign Application Priority Data

Nov. 2, 2020 (JP) ................................ 2020-183858

(51) Int. Cl.

| | |
|---|---|
| ***C11D 3/39*** | (2006.01) |
| ***C11D 1/00*** | (2006.01) |
| ***C11D 1/22*** | (2006.01) |
| ***C11D 3/00*** | (2006.01) |
| ***C11D 3/04*** | (2006.01) |
| ***C11D 3/10*** | (2006.01) |
| ***C11D 3/20*** | (2006.01) |
| ***C11D 3/28*** | (2006.01) |
| ***C11D 3/395*** | (2006.01) |

(52) U.S. Cl.

CPC .................. *C11D 1/22* (2013.01); *C11D 1/00* (2013.01); *C11D 3/0094* (2013.01); *C11D 3/04* (2013.01); *C11D 3/10* (2013.01); *C11D 3/2075* (2013.01); *C11D 3/2079* (2013.01); *C11D 3/2082* (2013.01); *C11D 3/2086* (2013.01); *C11D 3/28* (2013.01); *C11D 3/3902* (2013.01); *C11D 3/3942* (2013.01); *C11D 2111/22* (2024.01)

(58) Field of Classification Search

CPC .... C11D 1/00; C11D 3/04; C11D 3/10; C11D 3/2075; C11D 3/2079; C11D 3/2082; C11D 3/3902

USPC ................ 510/175, 176, 477, 488, 509, 372

See application file for complete search history.

(56) References Cited

U.S. PATENT DOCUMENTS

| | | | | |
|---|---|---|---|---|
| 2004/0231706 A1 | 11/2004 | Bhatnagar et al. | | |
| 2012/0073610 A1* | 3/2012 | Kamimura | G03F 7/423 | 134/26 |
| 2012/0108485 A1* | 5/2012 | Kamimura | C11D 3/046 | 510/176 |
| 2018/0204764 A1* | 7/2018 | Cooper | G03F 7/425 | |

FOREIGN PATENT DOCUMENTS

| | | | |
|---|---|---|---|
| EP | 3599634 A1 * | 1/2020 | B08B 3/04 |
| JP | 4668915 | 4/2011 | |
| JP | 4952257 | 6/2012 | |
| WO | WO-2020137359 A1 * | 7/2020 | C11D 11/0047 |

* cited by examiner

*Primary Examiner* — Gregory R Delcotto

(74) *Attorney, Agent, or Firm* — Wenderoth, Lind & Ponack, L.L.P.

(57) ABSTRACT

Provided is a cleaning composition for a component of a semiconductor manufacturing process chamber including: a foaming agent; an oxidizing agent; and an acidic compound, in which a value of (Number of moles of the acidic compound contained in the cleaning composition×acid valence of the acidic compound)/(Number of moles of the foaming agent contained in the cleaning composition×Base valence of the foaming agent) is more than 0.1 and less than 1.5.

6 Claims, No Drawings

CLEANING COMPOSITION AND CLEANING METHOD FOR COMPONENT OF SEMICONDUCTOR MANUFACTURING PROCESS CHAMBER

BACKGROUND OF THE INVENTION

Field of the Invention

The present invention relates to a cleaning composition and a cleaning method for a component of a semiconductor manufacturing process chamber.

Priority is claimed on Japanese Patent Application No. 2020-183858, filed on Nov. 2, 2020, the content of which is incorporated herein by reference.

Description of Related Art

In a process of a semiconductor substrate, a substrate is placed in a process chamber and exposed to plasma or an activating gas to deposit a substance on the substrate or etch a substance on the substrate. During such a process, a process residue is generated and deposited on the surface of a component of the chamber. As the deposited process residue increases in thickness, the process residue is peeled off from the surface of the chamber component and contaminates the substrate to be treated. Therefore, the deposited process residue needs to be cleaned regularly.

A large number of gas holes for supplying heat transfer gas or the like to the substrate are formed on a pedestal on which the substrate is mounted during a process in the process chamber. The residue accumulated in the gas holes interferes with the gas supply and causes pollution of the process gas. Therefore, the process residue in the gas holes also needs to be removed regularly.

As a method for removing the deposit of the process residue, there are a method of using a cleaning liquid (Japanese Patent No. 4952257), a method of using physical means, and the like. The method of using the cleaning liquid does not require a special device for cleaning, but it is difficult to remove the process residue accumulated in the gas holes.

As a method of using physical means, a method of removing the process residue in the gas holes by mechanically pushing an extension pin into the gas holes has been proposed (Japanese Patent No. 4668915). However, the method requires a mechanism to push the extension pin into the gas holes. In addition, an inner wall of the gas holes may be damaged or the removal of the process residue may be insufficient.

SUMMARY OF THE INVENTION

In order to perform stably a process required for semiconductor manufacturing, it is necessary to periodically remove a deposit of a process residue of a process chamber component. However, it is difficult to remove even a deposit in gas holes, and it is desired to develop a cleaning method capable of cleaning the inside of the gas holes.

The present invention has been made in view of the above circumstances, and an object of the present invention is to provide a cleaning composition and a cleaning method for a component of a semiconductor manufacturing process chamber, which are capable of removing a deposit in a gas hole.

In order to achieve the above object, the present invention has adopted the following configuration.

A first aspect of the present invention is a cleaning composition for a component of a semiconductor manufacturing process chamber including: an oxidizing agent; a foaming agent; and an acidic compound, in which a value of (Number of moles of the acidic compound contained in the cleaning composition×Acid valence of the acidic compound)/(Number of moles of the foaming agent contained in the cleaning composition×Base valence of the foaming agent) is more than 0.1 and less than 1.5.

A second aspect of the present invention is a cleaning method for a component of a semiconductor manufacturing process chamber, including: a step of cleaning a component of a semiconductor manufacturing process chamber by using the cleaning composition.

According to the present invention, it is possible to provide a cleaning composition and a cleaning method for a component of a semiconductor manufacturing process chamber, which are capable of removing a deposit in a gas hole.

DETAILED DESCRIPTION OF THE INVENTION (Cleaning Composition)

A cleaning composition for a component of a semiconductor manufacturing process chamber according to an embodiment of the present invention includes: a foaming agent; an oxidizing agent; and an acidic compound, in which a value of (Number of moles of the acidic compound contained in the cleaning composition×Acid valence of the acidic compound)/(Number of moles of the foaming agent contained in the cleaning composition×Base valence of the foaming agent) is more than 0.1 and less than 1.5.

<Component of Semiconductor Manufacturing Process Chamber>

The cleaning composition of the present embodiment is used to clean the component of a semiconductor manufacturing process chamber. The semiconductor manufacturing process chamber is a process chamber used for treating a semiconductor substrate in a semiconductor manufacturing process. Exemplary examples of the process of the semiconductor substrate include a chemical vapor deposition (CVD), dry etching, and the like, and are not limited thereto. The process chamber defines a process zone in which the semiconductor substrate is processed with plasma, an activating gas, or the like.

The component of the semiconductor manufacturing process chamber means a member configuring the semiconductor manufacturing process chamber. As the component of the process chamber, a component having a gas hole is preferable. The gas hole is used to supply a process gas, a heat transfer gas, or the like into the process chamber. Exemplary examples of the component having the gas hole include a pedestal and the like for holding a semiconductor substrate.

A deposit of process residue deposited on the component of the process chamber varies depending on a type of process, and usually contains an inorganic substance and an organic substance. Exemplary examples of the inorganic substance include a metal-containing substance such as silicon, aluminum, copper, titanium, and magnesium, and a metal oxide, and are not limited thereto. Exemplary examples of the organic substance include an organometallic compound of the metals, an organofluorine compound, an organonitrogen compound, and the like, and are not limited thereto. The cleaning composition of the present embodiment can satisfactorily remove even the deposit in the gas hole regardless of the type of the substance forming the deposit. Therefore, the cleaning composition of the present embodiment is preferably used to remove the deposit deposited in the gas hole by the semiconductor manufacturing process in the component having the gas hole.

<Oxidizing Agent: Component (A)>

In the cleaning composition of the present embodiment, the oxidizing agent (hereinafter, also referred to as a "component (A)") is a compound that can serve as an electron acceptor. In the cleaning composition of the present embodiment, the process residue is oxidized by an oxidizing agent, so that the process residue is easily peeled off and removed by foaming by a foaming agent described later.

The oxidizing agent is not particularly limited, and exemplary examples thereof include a peroxide (for example, hydrogen peroxide, periodate, and the like), hypochlorous acid, chlorous acid, hypobromous acid, transition metal oxide, peroxide, cerium ammonium nitrate, nitrate, nitrite, iodic acid, iodate, periodate, perchlorate, persulfuric acid, persulfate, peracetic acid, peracetate, permanganic acidic compound, dichromic acidic compound, and the like.

Among these, the hydrogen peroxide is preferable in that the hydrogen peroxide is easy to handle.

One kind of the oxidizing agent may be used alone or two or more kinds thereof may be used in combination.

A content of the oxidizing agent in the cleaning composition of the present embodiment is not particularly limited, and for example, is preferably 1% to 30% by mass, more preferably 3% to 20% by mass, further preferably 3% to 15% by mass, and particularly preferably 5% to 10% by mass, with respect to the entire cleaning composition (100% by mass). When the content of the oxidizing agent is equal to or more than the preferable lower limit values, a performance of removing the deposit in the gas hole is improved. When the content of the oxidizing agent is equal to or less than the preferable upper limit values, it becomes easy to achieve balance with other components.

<Foaming Agent: Component (B)>

The cleaning composition of the present embodiment contains the foaming agent (hereinafter, also referred to as a "component (B)"). The foaming agent is a compound that reacts with an acidic compound described later to generate a gas. In the cleaning composition of the present embodiment, foaming occurs inside the gas hole, so that the deposit in the gas hole is peeled off and removed.

The foaming agent is not particularly limited as long as the foaming agent is a compound that reacts with an acidic compound to generate a gas, and a carbonate is preferable. The carbonate reacts with an acidic compound to generate carbon dioxide ($CO_2$).

The carbonate is not particularly limited as long as the carbonate is a salt compound that reacts with an acidic compound to generate a carbon dioxide. The carbonate may be any of a positive salt, an acidic salt (bicarbonate), and a basic salt (carbonate hydroxide salt). Exemplary examples of the carbonate include a salt with an alkali metal, a salt with an alkaline earth metal, a salt with a transition metal, an ammonium salt, a salt with a guanidine or a guanidine derivative, and the like.

Exemplary examples of the salt with the alkali metal include sodium hydrogen carbonate, sodium carbonate, potassium carbonate, potassium hydrogen carbonate, lanthanum carbonate, lithium carbonate, and the like.

Exemplary examples of the salt with the alkaline earth metal include magnesium carbonate, calcium carbonate, strontium carbonate, and the like.

Exemplary examples of the salt with the transition metal include manganese carbonate, nickel carbonate, and the like.

Exemplary examples of the ammonium salt include ammonium carbonate, ammonium hydrogen carbonate, and the like.

Exemplary examples of the salt with guanidine or a guanidine derivative include aminoguanidine carbonate, guanidine carbonate, and the like.

Among these, as the foaming agent, the ammonium salt is preferable, and the ammonium hydrogen carbonate or the ammonium carbonate is more preferable.

One kind of the foaming agent may be used alone or two or more kinds thereof may be used in combination.

A content of the foaming agent in the cleaning composition of the present embodiment is not particularly limited, and for example, is preferably 1% to 30% by mass, more preferably 3% to 20% by mass, further preferably 5% to 10% by mass, with respect to the entire cleaning composition (100% by mass). When the content of the foaming agent is equal to or more than the preferable lower limit values, a performance of removing the deposit in the gas hole is improved. When the content of the foaming agent is equal to or less than the preferable upper limit values, it becomes easy to achieve balance with other components.

<Acidic Compound: Component (C)>

The cleaning composition of the present embodiment contains the acidic compound (hereinafter, also referred to as a "component (C)"). The acidic compound is a compound that can generate protons and can react with the foaming agent to generate a gas in the foaming agent.

The acidic compound is not particularly limited as long as the acidic compound is a compound that can react with the foaming agent to generate a gas in the foaming agent. The acidic compound may be an inorganic acid or an organic acid. Exemplary examples of the inorganic acid include sulfuric acid, hydrochloric acid, nitric acid, phosphoric acid, boric acid, and the like. Exemplary examples of organic acids include formic acid, acetic acid, oxalic acid, propionic acid, benzoic acid, glycolic acid, salicylic acid, glyceric acid, malonic acid, succinic acid, glutaric acid, adipic acid, pimelic acid, maleic acid, phthalic acid, malic acid, tartaric acid, citric acid, lactic acid, glycine, alanine, aspartic acid, glutamic acid, aminomethanesulfonic acid, taurine, benzenesulfonic acid, toluenesulfonic acid, methanesulfonic acid, ethanesulfonic acid, sulfamic acid, and the like.

The acidic compound preferably does not damage the component of the process chamber. Exemplary examples of a material of the component of the process chamber include aluminum material such as aluminum and anodized aluminum; ceramics such as alumina ceramics, yttria ceramics, and zirconia ceramics. As the acidic compound, a weak acid is preferable from the viewpoint of not damaging the component formed of these materials. The weak acid is, for example, an acid having an acid dissociation constant (pKa) of 1 or more at 25° C. Exemplary examples of the weak acid include, for example, boric acid, oxalic acid, formic acid, acetic acid, propionic acid, benzoic acid, glycolic acid, salicylic acid, glyceric acid, malonic acid, succinic acid, glutaric acid, adipic acid, pimelic acid, maleic acid, phthalic acid, malic acid, tartaric acid, citric acid, lactic acid, glycine, alanine, aspartic acid, glutamic acid, and the like, but are not limited thereto.

Among these, the citric acid is preferable in that the citric acid is excellent in detergency.

One kind of the acidic compound may be used alone or two or more kinds thereof may be used in combination.

A content of the acidic compound in the cleaning composition of the present embodiment is not particularly limited, and for example, is preferably 0.1% to 30% by mass, more preferably 0.5% to 25% by mass, further preferably 1% to 20% by mass, and particularly preferably 1% to 20% by mass, with respect to the entire cleaning composition (100% by mass). When the content of the acidic compound is equal to or more than the preferable lower limit values, a performance of removing the deposit in the gas hole is improved. When the content of the acidic compound is equal to or less than the preferable upper limit values, it becomes easy to achieve balance with other components.

The amount of the foaming agent (component (B)) and the acidic compound (component (C)) contained in the cleaning composition of the present embodiment is preferably set such that a [C/B] value obtained by Formula (1) is more than 0.1 and less than 1.5.

$$[C/B]=(\text{Number of moles of component }(C)\text{ contained in cleaning composition}\times\text{Acid valence of the component }(C))/(\text{Number of moles of component }(B)\text{ contained in the cleaning composition}\times\text{Base valence of component }(B)) \quad (1)$$

In Formula (1), the "Acid valence of component (C)" is the number of protons ($H^+$) that can be generated from the component (C) of one molecule. For example, in a case where the component (C) is citric acid, the acid valence is 3. In a case where there are two or more kinds of the component (C), for the (Number of moles of component (C) contained in the cleaning composition×Acid valence of component (C)) in Formula (1), a value is first calculated for each type of the component (C), and a total value thereof is obtained.

In Formula (1), the "Base valence of component (B)" is the number of hydroxide ions ($OH^-$) that can be generated from the component (B) of one molecule. For example, in a case where the component (B) is ammonium carbonate, the base valence is 2. In a case where the component (B) is ammonium hydrogen carbonate, the base valence is 1. In a case where there are two or more kinds of the component (B), for the (Number of moles of component (B) contained in the cleaning composition×Base valence of component (B)) in Formula (1), a value is first calculated for each type of the component (B), and a total value thereof is obtained.

When setting the value of [C/B] to more than 0.1 and less than 1.5, the performance of removing the deposit in the gas hole is improved. The value of [C/B] is preferably 0.15 or more, and more preferably 0.2 or more. The value of [C/B] is preferably 1.3 or less, more preferably 1.2 or less, further preferably 1.1 or less, and particularly preferably 1.0 or less. When the value of [C/B] is 0.1 or less, the amount of the component (C) relative to the component (B) is small and a sufficient foaming amount for removing the deposit in the gas hole cannot be obtained. When the value of [C/B] is 1.5 or more, the pH becomes too low and detergency deteriorates.

<Optional Component>

The cleaning composition of the present embodiment may contain other components in addition to the above components within a range not impairing an effect of the present invention. Other components are not particularly limited, and exemplary examples thereof include a solvent, a surfactant, and an anticorrosive agent.

<<Solvent: Component (S)>>

The cleaning composition of the present embodiment contains a solvent (hereinafter, also referred to as "component (S)") for dissolving the components (A) to (C). Water is usually used as the component (S). As the water, purified water such as distilled water, ion-exchanged water, and ultrapure water is preferable, and ultrapure water generally used for semiconductor manufacturing is more preferable.

The component (S) may contain an organic solvent without not impairing the effect of the present invention. Exemplary examples of the organic solvent include a polar solvent such as dimethyl sulfoxide (DMSO), dimethylformamide (DMF), and N-methylpyrrolidone (NMP). The content of the organic solvent is, for example, 10% by mass or less, preferably 5% by mass or less, more preferably 3% by mass or less, and particularly preferably 1% by mass or less with respect to the entire component (S) (100% by mass).

The component (S) preferably does not contain an organic solvent, and the entire component (S) is more preferably water.

The cleaning composition of the present embodiment preferably contains water as the component (S) in an amount of preferably 65% by mass or more, more preferably 70% by mass or more, and further preferably 75% by mass or more, with respect to the entire cleaning composition (100% by mass). The water content can be appropriately adjusted depending on the content of the components (A) to (C).

<<Surfactant: Component (D)>>

The cleaning composition of the present embodiment may contain the surfactant (hereinafter, also referred to as a "component (D)"). When containing the surfactant, bubbles generated by the foaming agent can be densified and the detergency can be improved. In addition, the cleaning composition can easily enter the gas hole.

The surfactant is not particularly limited, and a known surfactant can be used without particular limitation. Exemplary examples of the surfactant include a cationic surfactant, an amphoteric surfactant, an anionic surfactant, a nonionic surfactant, and the like.

Exemplary examples of the cationic surfactant include a quaternary ammonium salt-based surfactant, an alkylpyridium-based surfactant, and the like. Specific examples of the cationic surfactant include tetraalkylammonium salt, alkylamine salt, benzalkonium salt, alkylpyridium salt, imidazolium salt, and the like.

Exemplary examples of the anionic surfactant include alkyl sulfonic acid, alkyl benzene sulfonic acid, alkyl naphthalene sulfonic acid, alkyl diphenyl ether sulfonic acid, fatty acid amide sulfonic acid, polyoxyethylene alkyl ether carboxylic acid, polyoxyethylene alkyl ether acetic acid, polyoxyethylene alkyl ether propionic acid, alkyl phosphonic acid, fatty acid salt, and the like. Exemplary examples of the "salt" include ammonium salt, sodium salt, potassium salt, tetramethylammonium salt, and the like. Specific examples of the anionic surfactant include sodium dodecylbenzene sulfonate, sodium lauryl sulfate, sodium alkyldiphenyl ether disulfonate, sodium alkylnaphthalene sulfonate, and the like.

Exemplary examples of amphoteric surfactant include a betaine-type surfactant, an amino acid-type surfactant, an imidazoline-type surfactant, an amine oxide-type surfactant, and the like. Specific examples of the amphoteric surfactant include carboxybetaine, sulfobetaine, aminocarboxylic acid salt, imidazoline derivative, and the like.

Exemplary examples of the nonionic surfactant include a polyalkylene oxide alkylphenyl ether-based surfactant, a polyalkylene oxide alkyl ether-based surfactant, a block polymer-based surfactant formed of polyethylene oxide and polypropylene oxide, polyoxyalkylene distyrene phenyl ether-based surfactant, polyalkylene tribenzyl phenyl ether-based surfactant, acetylene polyalkylene oxide-based surfactant. Specific examples of the nonionic surfactant include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, and glycerin fatty acid ester, polyoxyethylene glycerin fatty acid ester, polyglycerin fatty acid ester, sucrose fatty acid ester, polyoxyethylene alkylamine, polyoxyethylene fatty acid amide, alkylalkanolamide, acetylene glycol, a polyoxyethylene adduct of acetylene glycol, and the like. Alternatively, a polyoxypropylene-based compound in which the oxyethylene structure in the exemplary compounds is an oxypropylene structure is also an exemplary example.

Among these, the surfactant is preferably the anionic surfactant, more preferably the alkylbenzene sulfonate, and further more preferably the sodium dodecylbenzenesulfonate in that the effect of densifying bubbles is excellent.

One kind of the surfactant may be used alone or two or more kinds thereof may be used in combination.

A content of the surfactant in the cleaning composition of the present embodiment is not particularly limited, and for example, is preferably 0% to 5% by mass, more preferably 0.05% to 3% by mass, further preferably 0.05% to 1% by mass, and particularly preferably 0.1% to 0.5% by mass, with respect to the entire cleaning composition (100% by mass). When the content of the surfactant is in the preferable range, the bubbles generated by the foaming agent tend to become dense.

<<Anticorrosive Agent>>

The cleaning composition of the present embodiment may contain the anticorrosive agent (hereinafter, also referred to as a "component (E)"). When containing the anticorrosive agent, damage to the component of the process chamber can be reduced.

The anticorrosive agent is not particularly limited, and a known anticorrosive agent can be used without particular limitation. The anticorrosive agent preferably has an anticorrosive effect on the metal used for the component of the process chamber. Exemplary examples of the metal used for the component of the process chamber include aluminum, anodized aluminum, the ceramics, and the like.

Exemplary examples of the anticorrosive agent include compounds containing a nitrogen-containing heterocycle such as a triazole ring, an imidazole ring, a pyridine ring, a phenanthroline ring, a tetrazole ring, a pyrazole ring, and a pyrimidine ring.

Exemplary examples of the compound containing the triazole ring include triazoles such as 1,2,3-triazole, 1,2,4-triazole, 3-amino-1H-1,2,4-triazole, 1-acetyl-1H-1,2,3-triazolo[4,5-b]pyridine, 1H-1,2,3-triazolo[4,5-b]pyridine, 1,2,4-triazolo[4,3-a]pyridine-3(2H)-one, and 3H-1,2,3-triazolo[4,5-b]pyridine-3-ol; and benzotriazoles such as 1,2,3-benzotriazole, 5-methyl-1H-benzotriazole, 1-hydroxy benzotriazole, 1-dihydroxypropylbenzotriazole, 2,3-dicarboxypropylbenzotriazole, 4-hydroxybenzotriazole, 4-carboxyl-1H-benzotriazole, 4-carboxyl-1H-benzotriazole methyl ester, 4-carboxyl-1H-benzotriazole butyl ester, 4-carboxyl-1H-benzotriazole octyl ester, 5-hexylbenzotriazole, [1,2,3-benzotriazolyl-1-methyl] [1,2,4-triazolyl-1-methyl] [2-ethylhexyl] amine, tolyltriazole, naphthotriazole, bis[(1-benzotriazolyl) methyl] phosphonic acid, and 3-aminotriazole. Among these, the 1,2,4-triazole, the 1,2,3-benzotriazole, and the 5-methyl-1H-benzotriazole are preferable.

Exemplary examples of the compound containing the imidazole ring include imidazoles such as 2-methylimidazole, 2-ethyl imidazole, 2-isopropyl imidazole, 2-propyl imidazole, 2-butyl imidazole, 4-methyl imidazole, 2, 4-dimethyl imidazole, 2-ethyl-4-methylimidazole, 2-undecylimidazole, and 2-aminoimidazole; and biimidazoles such as 2,2'-biimidazole. Among these, the biimidazoles are preferable, and the 2,2'-biimidazole is more preferable.

Exemplary examples of the compound containing the pyridine ring include pyridines such as 1H-1,2,3-triazolo[4,5-b]pyridine, 1-acetyl-1H-1,2,3-triazolo[4,5-b]pyridine, 3-aminopyridine, 4-aminopyridine, 3-hydroxypyridine, 4-hydroxypyridine, 2-acetamidopyridine, 4-pyrrolidinopyridine, and 2-cyanopyridine; and bipyridyls such as 2,2'-bipyridyl, 4,4'-dimethyl-2,2'-bipyridyl, 4,4'-di-tert-butyl-2,2'-bipyridyl, and 4,4-dinonyl-2,2-bipyridyl. Among these, the bipyridyls are preferable, and the 2,2'-bipyridyl, the 4,4'-dimethyl-2,2'-bipyridyl, the 4,4'-di-tert-butyl-2,2'-bipyridyl, and the 4,4-dinonyl-2,2-bipyridyl are more preferable.

Exemplary examples of the compound containing the phenanthroline ring include 1,10-phenanthroline and the like.

Exemplary examples of the compound containing the tetrazole ring include 1H-tetrazole, 5-amino-1H-tetrazole, 5-methyl-1H-tetrazole, 5-phenyl-1H-tetrazole, 1-(2-diaminoethyl)-5-mercaptotetrazole, and the like.

Exemplary examples of the compound containing the pyrazole ring include 3,5-dimethylpyrazole, 3-amino-5-methylpyrazole, 4-methylpyrazole, 3-amino-5-hydroxypyrazole, and the like.

Exemplary examples of the compound containing the pyrimidine ring include pyrimidine, 1,2,4-triazolo[1,5-a]pyrimidine, 1,3,4,6,7,8-hexahydro-2H-pyrimido[1,2-A]pyrimidine, 1,3-diphenyl-pyrimidine-2,4,6-trione, 1,4,5,6-tetrahydropyrimidine, 2,4,5,6-tetraaminopyrimidine sulfate, 2,4,5-trihydroxypyrimidine, 2,4,6-triaminopyrimidine, 2,4,6-trichloropyrimidine, 2,4,6-trimethoxypyrimidine, 2,4,6-triphenylpyrimidine, 2,4-diamino-6-hydroxylpyrimidine, 2,4-diaminopyrimidine, 2-acetamidopyrimidine, 2-aminopyrimidine, 2-methyl-5,7-diphenyl-(1,2,4)triazolo(1,5-a)pyrimidine, 2-methylsulfanyl-5,7-diphenyl-(1,2,4)triazolo(1,5-a)pyrimidine, 2-methylsulfanyl-5,7-diphenyl-4,7-dihydro-(1,2,4)triazolo(1,5-a)pyrimidine, 4-aminopyrazolo[3,4-d]pyrimidine, and the like.

Among these, as the anticorrosive agent, the compound containing the triazole ring is preferable and the benzotriazole is more preferable, in that the anticorrosive effect is high.

One kind of the anticorrosive agent may be used alone or two or more kinds thereof may be used in combination.

A content of the anticorrosive agent in the cleaning composition of the present embodiment is not particularly limited, and for example, is preferably 0% to 10% by mass, more preferably 0.05% to 5% by mass, further preferably 0.1% to 3% by mass, and particularly preferably 0.3% to 1% by mass, with respect to the entire cleaning composition (100% by mass). When the content of the anticorrosive agent is equal to or more than the preferable lower limit values, it becomes easy to obtain the anticorrosive effect on a metal member contained in the component of the process chamber. When the content of the anticorrosive agent is equal to or less than the preferable upper limit values, it becomes easy to achieve balance with other components.

<pH>

The pH of the cleaning composition of the present embodiment is not particularly limited, and is preferably pH 7.6 or higher, more preferably pH 7.8 or higher, and further preferably pH 8 or higher. An upper limit of pH is preferably pH 9 or lower, more preferably pH 8.5 or lower, and further preferably pH 8.3 or lower. The pH range is, for example, pH 7.6 to 9, pH 7.6 to 8.5, pH 7.6 to 8.3, pH 7.8 to 9, pH 7.8 to 8.5, pH 7.8 to 8.3, or the like. When the pH of the cleaning composition is within the preferable range, the performance of removing the deposit in the gas hole is further improved.

When the pH is outside the preferable range, the component may be damaged depending on the metal type of the metal member contained in the component of the process chamber.

<Two-Component Mixed Type Cleaning Composition>

The cleaning composition of the present embodiment is preferably a two-component mixed type cleaning composition. The two-component mixed type cleaning composition is a cleaning composition in which two liquids are mixed and used at the time of use. The cleaning composition of the present embodiment is preferably a two-component mixed type cleaning composition in which a first liquid containing the component (A) and the component (C) and a second liquid containing the component (B) are mixed and used. When using the two-component mixed type, it is possible to avoid the reaction between the component (B) and the component (C) during storage and obtain good foamability during use.

<<First Liquid>>

The first liquid contains the component (A) and the component (C). The first liquid may contain an optional component as described above in addition to the component (A) and the component (C). The first liquid may contain the component (D) in addition to the component (A) and the component (C), and may further contain the component (E).

The first liquid contains a solvent for dissolving the above components. The same solvent as the component (S) is an exemplary example of the solvent of the first liquid, and water is usually used.

The first liquid contains the component (C) so that the value of [CB] becomes more than 0.1 and less than 1.5 when mixed with the second liquid. In addition, it is preferable to contain each component so that each component is in the preferable ranges when mixed with the second liquid.

<<Second Liquid>>

The second liquid contains the component (B). The second liquid may contain the optional component as described above in addition to the component (B). The second liquid may contain the component (E) in addition to the component (B), and may further contain the component (D).

The second liquid contains a solvent for dissolving the above components. The same solvent as the component (S) is an exemplary example of the solvent of the second liquid, and water is usually used.

The second liquid contains the component (B) so that the value of [C/B] becomes more than 0.1 and less than 1.5 when mixed with the first liquid. In addition, it is preferable to contain each component so that each component is in the preferable ranges when mixed with the first liquid.

According to the cleaning composition of the present embodiment, by containing the foaming agent and the acidic compound, bubbles generated from the reaction between the foaming agent and the acidic compound act on the deposit in the gas hole and the deposit is peeled off from the inner wall of the gas hole and, by containing the oxidizing agent, the deposit becomes to easily peeled off. Therefore, even the deposit in the gas hole can be satisfactorily removed.

(Cleaning Method)

The cleaning method for the component of the semiconductor manufacturing process chamber according to another embodiment of the present invention includes a step of cleaning a component of a semiconductor manufacturing process chamber by using the cleaning composition according to the embodiment (hereinafter, also referred to as a "cleaning step").

<Cleaning Step>

The cleaning step can be performed by bringing the cleaning composition according to the embodiment into contact with the component to be cleaned. A method of bring the component contact with the cleaning composition is not particularly limited, and a known method can be used. The components may or may not be removed from the process chamber prior to cleaning. It is preferable that the component is detached from the process chamber in that contacting with the cleaning composition becomes to easy.

Exemplary examples of the method of contacting the cleaning composition include a method of spraying the cleaning composition onto the component, a method of immersing the component in the cleaning composition, and the like. The method of immersing the component to be cleaned in the cleaning composition is preferable in that the detergency is good.

In a case where the cleaning composition is the two-component mixed type, it is preferable to mix the two liquids immediately before use. For example, the cleaning step can be performed by putting the first liquid and the second liquid in a cleaning tank and mixing the liquids to prepare a cleaning composition, and then immersing the component to be cleaned in the cleaning composition.

The cleaning temperature is, for example, preferably 60° C. or higher, more preferably 70° C. or higher, further preferably 80° C. or higher, and particularly preferably 90° C. or higher. An upper limit of the cleaning temperature is the boiling point of the cleaning composition, and is usually about 100° C. to 110° C. By setting the cleaning temperature to the lower limit value or higher, the detergency is improved.

The cleaning time is not particularly limited as long the time is sufficient for the deposit in the gas hole to be peeled off. The cleaning time is preferably 10 minutes or longer, more preferably 15 minutes or longer, further preferably 20 minutes or longer, and particularly preferably 25 minutes or longer. An upper limit of the cleaning time is not particularly limited, and for example, 120 minutes or shorter, 100 minutes or shorter, 60 minutes or shorter, 50 minutes or shorter, 40 minutes or shorter, 30 minutes or shorter, or the like.

The component may be cleaned with the cleaning composition and then rinsed with a rinsing liquid to remove the cleaning composition from the component. As the rinsing liquid, for example, water can be used. Rinsing with the rinsing liquid can be performed by bringing the rinsing liquid into contact with the component. Exemplary examples of the method of contacting the rinsing liquid include a method of spraying the rinsing liquid onto the component, a method of immersing the component in the rinsing liquid, and the like. A method of immersing the component in the rinsing liquid is preferable in that the cleaning liquid composition can be efficiently removed.

The rinsing can be performed at room temperature, for example, at 20° C. to 30° C. The rinsing time is not particularly limited, and can be, for example, about 1 to 15 minutes.

According to the cleaning method of the present embodiment described above, the cleaning step is performed using the cleaning composition of the embodiment. As a result, even the deposit inside the gas hole can be removed, and even the component provided with the gas hole can be satisfactorily cleaned.

EXAMPLES

Hereinafter, the present invention will be described in more detail with reference to examples, but the present invention is not limited to the examples.

Preparation of Cleaning Composition

Examples 1 to 3 and Comparative Examples 1 to 5

A first liquid and a second liquid were prepared for a cleaning composition of each example shown in Table 1. The first liquid was produced by dissolving an oxidizing agent (component (A)), an acidic compound (component (C)), and a surfactant (component (D)) in water so as to have twice the concentration shown in Table 1. The second liquid was prepared by dissolving a foaming agent (component (B)) and an anticorrosive agent (component (E)) in water so as to have twice the concentration shown in Table 1. Equal amounts of the first liquid and the second liquid were mixed to prepare the cleaning composition of each example shown in Table 1. In addition, the pH of the cleaning composition was measured and shown in Table 1. In addition, the value of [C/B] was calculated by the following formula and shown in Table 1.

$$[C/B]=(\text{Number of moles of component }(C)\times\text{Acid valence of component }(C))/(\text{Number of moles of component }(B)\times\text{Base valence of component }(B))$$

TABLE 1

| | Component (A) | Component (B) | Component (C) | Component (D) | Component (E) | Water | pH | [C/B] |
|---|---|---|---|---|---|---|---|---|
| Example 1 | (A)-1 [6.0] | (B)-1 [6.0] | (C)-1 [5.0] | (D)-1 [0.1] | (E)-1 [0.5] | [82.4] | 8 | 1.0 |
| Comparative Example 1 | (A)-1 [6.0] | (B)-1 [6.0] | (C)-1 [7.5] | (D)-1 [0.1] | (E)-1 [0.5] | [79.9] | 6-7 | 1.5 |
| Example 2 | (A)-1 [6.0] | (B)-2 [6.0] | (C)-1 [8.0] | (D)-1 [0.1] | (E)-1 [0.5] | [79.4] | 8 | 1.0 |
| Comparative Example 2 | (A)-1 [6.0] | (B)-2 [6.0] | (C)-1 [12.0] | (D)-1 [0.1] | (E)-1 [0.5] | [75.4] | 6-7 | 1.5 |
| Comparative Example 3 | (A)-1 [6.0] | (B)-1 [6.0] | — | — | — | [88.0] | ND | — |
| Comparative Example 4 | — | (B)-1 [6.0] | (C)-1 [5.0] | — | — | [89.0] | ND | 1.0 |
| Comparative Example 5 | (A)-1 [6.0] | — | (C)-1 [5.0] | — | — | [89.0] | ND | — |
| Example 3 | (A)-1 [6.0] | (B)-1 [6.0] | (C)-1 [1.0] | (D)-1 [0.1] | (E)-1 [0.5] | [86.4] | 8 | 0.2 |
| Comparative Example 6 | (A)-1 [6.0] | (B)-1 [6.0] | (C)-1 [0.5] | (D)-1 [0.1] | (E)-1 [0.5] | [86.9] | 8-9 | 0.1 |

In Table 1, each abbreviation has the following meaning. The value in [ ] is the blending amount (% by mass). ND means not measuring.

(A)-1: Hydrogen peroxide (B)-1: Ammonium hydrogen carbonate (B)-2: Ammonium carbonate (C)-1: Citric acid (D)-1: Sodium dodecylbenzene sulfonate (E)-1: Benzotriazole

[Evaluation of Detergency]

The detergency of the cleaning composition of each example was evaluated using a wafer pedestal having a gas hole as a component of a semiconductor manufacturing process chamber. For the wafer pedestal, a pedestal which is used in the semiconductor manufacturing process and in which the process residue was deposited in the gas hole was used.

The wafer pedestal was immersed in 10 mL of the cleaning composition and allowed to stand at 100° C. for 30 minutes. The wafer pedestal was then removed from the cleaning composition, rinsed with water and dried.

The gas hole of the wafer pedestal was observed with a scanning electron microscope (S4700, manufactured by Hitachi High-Technologies Corporation), and the detergency was evaluated based on the following evaluation criteria. The results are shown in Table 2 as “Detergency”.

<Evaluation Criteria>

A: No process residue is observed in the gas hole.

B: A process residue is observed in an inner wall of the gas hole.

C: The gas hole is clogged with the process residue.

TABLE 2

| | Detergency |
|---|---|
| Example 1 | A |
| Comparative Example 1 | B |
| Example 2 | A |
| Comparative Example 2 | B |
| Comparative Example 3 | C |
| Comparative Example 4 | C |
| Comparative Example 5 | C |
| Example 3 | A |
| Comparative Example 6 | C |

In Examples 1 to 3, the detergency was good, and no process residue was observed in the gas hole after cleaning.

On the other hand, in Comparative Examples 1 and 2, the clogging due to the process residue of the gas hole was cleared, but the process residue remained on the inner wall of the gas hole. In Comparative Examples 3, 4, 5 and 6, the process residue of the gas hole was not removed, and the gas hole remained clogged with the process residue.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. A cleaning composition for a component of a semiconductor manufacturing process chamber comprising:

5% to 10% by mass of peroxide;

5% to 10% by mass of an ammonium salt; and

1% to 20% by mass of an acid having an acid dissociation constant (pKa) of 1 or more at 25° C.; and water as a solvent, wherein a value of (Number of moles of the acid contained in the cleaning composition×Acid valence of the acid)/(Number of moles of the ammonium salt contained in the cleaning composition×Base valence of the ammonium salt) is 0.2 or more and 1.0 or less, wherein the solvent does not contain an organic solvent, and wherein the cleaning composition has a pH of 7.6 to 9.

2. The cleaning composition according to claim 1, wherein the cleaning composition is a two-component mixed cleaning composition formed by mixing a first liquid comprising the peroxide and the acid and a second liquid comprising the ammonium salt.

3. The cleaning composition according to claim 1, wherein the component has a gas hole, and the cleaning composition is used to remove a deposit deposited in the gas hole by a semiconductor manufacturing process.

4. The cleaning composition according to claim 1, further comprising a surfactant.

5. The cleaning composition according to claim 1, further comprising an anticorrosive agent.

6. A cleaning method for a component of a semiconductor manufacturing process chamber, comprising:

cleaning a component of a semiconductor manufacturing process chamber by applying the cleaning composition according to claim 1 to the component.

* * * * *